United States Patent
Adir et al.

(10) Patent No.: US 8,806,270 B2
(45) Date of Patent: Aug. 12, 2014

(54) METHOD, APPARATUS AND PRODUCT FOR TESTING TRANSACTIONS

(75) Inventors: Allon Adir, Kiryat Tivon (IL); Dimtry Krestyashyn, Haifa (IL); Charles Meissner, Austin, TX (US); Amir Nahir, Kfar Vitkin (IL)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/295,104

(22) Filed: Nov. 14, 2011

(65) Prior Publication Data

US 2013/0124920 A1    May 16, 2013

(51) Int. Cl.
G06F 11/00    (2006.01)
(52) U.S. Cl.
USPC .............................. 714/11; 717/126; 717/127
(58) Field of Classification Search
USPC .......................................................... 714/11
See application file for complete search history.

(56) References Cited

U.S. PATENT DOCUMENTS

| | | | |
|---|---|---|---|
| 2003/0130831 A1 | 7/2003 | Adir | |
| 2004/0117516 A1* | 6/2004 | Date | 710/6 |
| 2008/0109641 A1 | 5/2008 | Ball et al. | |
| 2009/0044174 A1* | 2/2009 | Dolby et al. | 717/127 |
| 2009/0077540 A1* | 3/2009 | Zhou et al. | 717/126 |
| 2010/0088702 A1* | 4/2010 | Dern et al. | 718/101 |
| 2010/0192131 A1 | 7/2010 | Dolby et al. | |
| 2010/0332538 A1* | 12/2010 | Gray et al. | 707/774 |
| 2010/0332808 A1* | 12/2010 | Adl-Tabatabai et al. | 712/225 |
| 2013/0111444 A1* | 5/2013 | Jones | 717/124 |

OTHER PUBLICATIONS

Allon Adir and Gil Shurek, "Generating concurrent test-programs with collisions for multi-processor verification", Seventh IEEE International High-Level Design Validation and Test Workshop (HLDVT), pp. 77-82, 2002.
Saha, A. et al., "A simulation-based approach to architectural verification of multiprocessor systems", Proceedings of the IEEE Fourteenth Annual International Phoenix Conference on Computers and Communications Conference, pp. 34-37, 1995.
Chaiyasit Manovit et al., "Testing implementations of transactional memory". 15th International Conference on Parallel Architecture and Compilation Techniques, pp. 134-143, 2006.
Collier, William W., "Reasoning About Parallel Architectures", Prentice Hall, 1992.
Min Xu et. Al., "A Serializability Violation Detector for Shared-Memory Server Programs", PLDI'05, Jun. 12-15, 2005, Chicago, Illinois, USA. Publisher: ACM.
Allon Adir and Brett St.Onge., "Checking Transactions in GPro tests", IBM Labs in Haifa, Nov. 2009.

* cited by examiner

Primary Examiner — Kamini Patel
(74) Attorney, Agent, or Firm — Ziv Glazberg

(57) ABSTRACT

A computer-implemented method and apparatus, comprising: having a plurality of processing entities operating substantially concurrently in a computerized platform enabling transaction operations, wherein the plurality of processing entities comprise two or more entities adapted to store values, and one or more entity adapted to load values, wherein each writing entity is associated with a private memory location within a memory unit; storing symbols into an associated target memory location by each of the entities adapted to store values, wherein symbols are stored according to a predetermined order, wherein a symbol is stored using a transaction; loading a multiplicity of private memory locations by the at least one entity adapted to load values, to obtain loaded values; and analyzing the loaded values for at least one invariant.

23 Claims, 4 Drawing Sheets

METHOD, APPARATUS AND PRODUCT FOR TESTING TRANSACTIONS

TECHNICAL FIELD

The present disclosure relates to testing in general, and to a scenario for testing transactions in hardware or software products.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware of a marketed product may be expensive to fix, as patching it requires call-back of the computerized device. Hence, many developers of computerized devices invest a substantial portion of the development cycle in discovering erroneous behaviors of the computerized device.

A specific problem in testing relates to hardware or software products that need to comply with specification that includes transactions. Such products may include multiple processor or multiple thread architectures which utilize transactional memory. Software examples may include environments such as Java Virtual Machines (JVMs) that support Java with transactions, and database management systems that support transactions.

In the current context, the term transaction generally refers to a construct in hardware or software interface that encapsulates a set of instructions. Transactions can be used by one or more concurrent or parallel processes using a shared resource. It will be appreciated, however, that the term concurrency may relate to pseudo-concurrency, such as, for example, a mechanism wherein one processor performs two or more software processes intermittently.

The operations comprised by the transaction have to appear to be performed atomically, i.e., either all or none are performed, without observable collisions with another process performing an operation therebetween, such as accessing the resources associated with the transaction. For example, a non-atomic procedure for transferring money may comprise several operations: reading the debited account balance, deducting the transferred amount from the balance, reading the credited account balance, and crediting the transferred amount. If the procedure is performed in a non-atomic manner, after the debited account balance is read, another concurrent process may change the balance, thereby the final determined balance would be wrong. In the case of hardware, the hardware design may implement transactions by tracking global accesses to transactional resources and aborting and retrying a transaction when a collision is detected. Other manners of implementing transactions may utilize obtaining a software or hardware lock, using mutual exclusion object (mutex), or the like.

Some transaction specifications also require that all the transactions in the application are serializable, i.e., the transactions appear to all processes to be ordered in a consistent way.

Verifying that an implementation of a product adheres with the atomicity and serialization requirements is similar to but harder than checking memory coherency. The current problem is harder since it may involve multiple accesses to multiple memory locations in a single transaction. Also, known methods for memory coherency verification relate to checking that a given test adheres with the requirements. However, the degree to which the test indeed checks the atomicity and serialization is up to the test designer. In addition, the efficiency and scalability of such solutions may not be satisfactory, i.e., as more processes are performed in parallel, the testing time or complexity may increase to non-practical values.

BRIEF SUMMARY

One exemplary embodiment of the disclosed subject matter is a computer-implemented method performed by a computerized device, comprising: having a plurality of processing entities operating substantially concurrently in a computerized platform enabling transaction operations, wherein the plurality of processing entities comprise two or more entities adapted to store values, and one or more entities adapted to load values, wherein each writing entity is associated with a private memory location within a memory unit; storing symbols into an associated target memory location by each of the entities adapted to store values, wherein symbols are stored according to a predetermined order, wherein a symbol is stored using a transaction; loading a multiplicity of private memory locations by the entities adapted to load values, to obtain loaded values; and analyzing the loaded values for one or more invariants.

Another exemplary embodiment of the disclosed subject matter is an apparatus having a processing unit and a storage device, the apparatus comprising: two or more components adapted to store values, each component storing symbols having a partial order into one a private memory locations within a memory unit, wherein symbols are stored according to a predetermined order such that each symbol is stored once, and wherein each symbol is stored using a transaction; a component adapted to load values for reading values stored within the private memory locations; and an analysis component for analyzing the values loaded by the component adapted to load values for invariants, wherein the components adapted to store values, the component adapted to load values and the analysis component are configured to operate substantially concurrently.

Yet another exemplary embodiment of the disclosed subject matter is a computer program product comprising: a non-transitory computer readable medium; a first program instruction for having a plurality of processing entities operating substantially concurrently in a computerized platform enabling transaction operations, wherein the plurality of processing entities comprise two or more entities adapted to store values, and one or more entities adapted to load values, wherein each writing entity is associated with a private memory location within a memory unit; a second program instruction for storing symbols into an associated target memory location by each of the entities adapted to store values, wherein symbols are stored according to a predetermined order, wherein a symbol is stored using a transaction; a third program instruction for loading a multiplicity of private memory locations by any of the entities adapted to load values, to obtain loaded values; and a fourth program instruction for analyzing the loaded values for one or more invariants, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
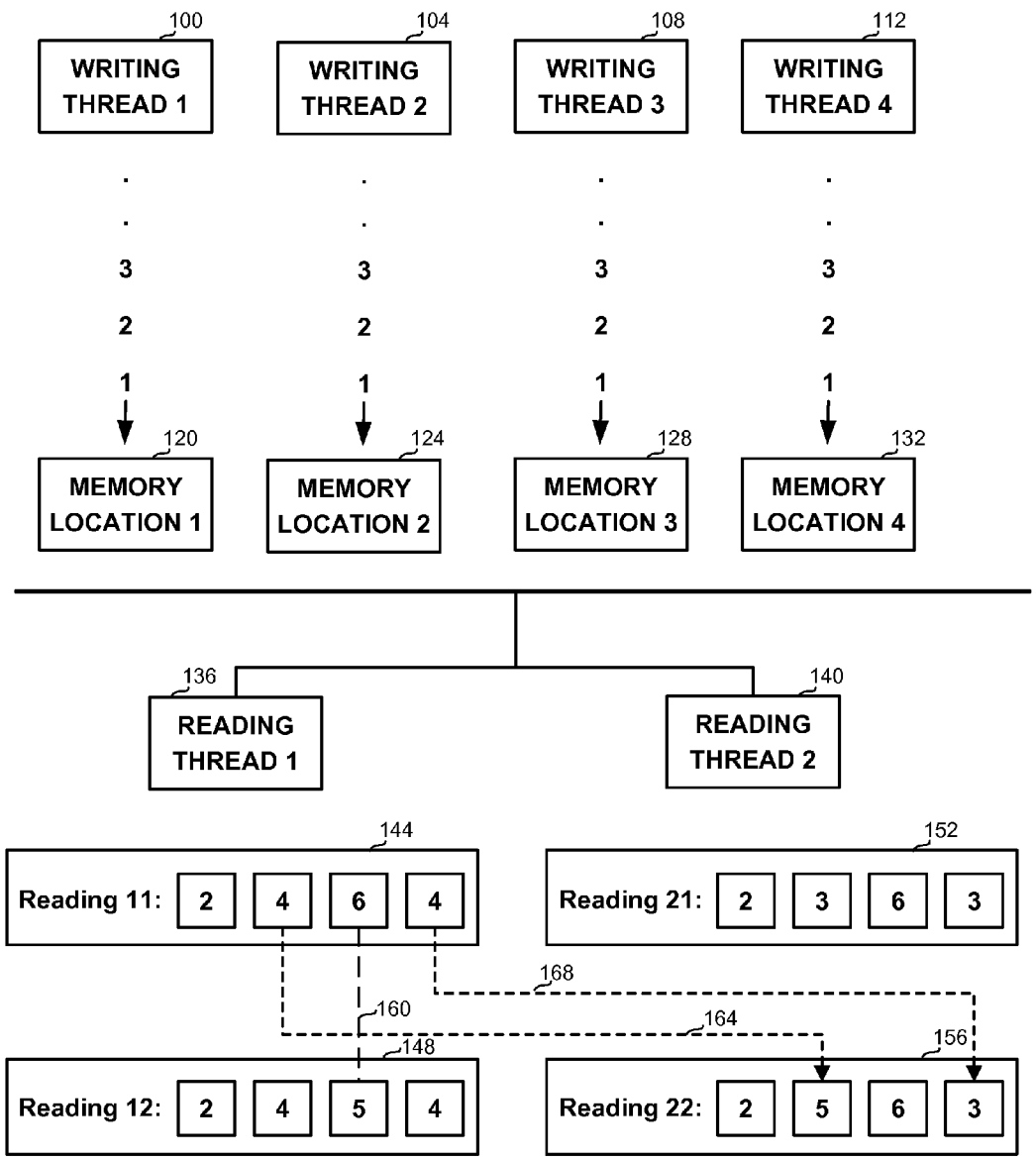
FIGS. 1A and 1B show schematic illustrations of order inconsistencies that can be checked, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is testing that a platform implementing transactions adheres to desired properties.

Another technical problem is to overcome the difficulty to test a hardware or software device that supports transactions to determine that it adheres to properties such as atomicity and serialization. It is desired to provide tests that check multiple scenarios and combinations so as to trigger a variety of behaviors, and not rely on specifically designed tests which may or may not cover all behaviors and trigger existing bugs. In some exemplary embodiments, no a-prior known solution can be provided and thus the provided scenarios may have to include a self check that specifically relates to the scenario.

Yet another technical problem relates to testing the transactions in a relatively efficient manner It will be noted that if the platform is stopped for checking the result of each test or group of tests, then the utilization of the testing platform may be lower compared to scenarios in which testing does not stop for checking the results.

Some known testing techniques use a reference model for comparing results with expected results. However in some testing platforms, utilization of a reference model may not be possible or efficient. For example, in a post-silicon product, implementing a reference model and executing it by the post-silicon product, may not be feasible. Additionally or alternatively, implementing the reference model on the post-silicon product may be inefficient and reduces utilization of the post-silicon product.

Yet another technical problem relates to testing the transactions in a scalable manner It will be noted that postponing checking the results may require storing the results in memory, and hence limited by the resources available. Particularly with post-silicon product, which are often characterized in having a memory unit of relatively small capacity, but also with other products, this may reduce scalability of the testing operation.

One technical solution comprises spawning or utilizing multiple processing entities that execute in parallel or concurrently and access shared resources, so that each processing entity has a designated role in the context of the testing. The processing entities can be threads which may be executed in parallel by one or more processors, or any other processing entities such as processes, processors, hardware threads, or the like.

For simplicity, the description below relates to the threads. It will, however, be appreciated that the description is not limited to the processing entities being threads.

In some exemplary embodiments, testing a transaction platform is performed by a plurality of threads. Two or more of the threads may be designated as writer threads, wherein each writing thread writes symbols into a private target memory location within a memory unit, in a predetermined order.

A memory location is said to be "private" or "owned" if it is associated with a single thread that updates its content. In some exemplary embodiments, additional threads may gain read access to the content of the private (or owned) memory location.

In some exemplary embodiments, the predetermined order of the symbols may be an order that can be efficiently utilized in accordance with the disclosed subject matter. In some exemplary embodiments, the predetermined order may be a monotonous increasing order, such that determining the next symbol is easily performed and determining that symbols are in accordance with the predetermined order is performed in a relatively efficient manner Other predetermined orders may be used, such as monotonous decreasing order, or the like.

In some embodiments, the symbols may be numbers or characters ordered according to their natural order, numbers or characters in any arbitrary order, for example 8-2-3-6-4- etc., or any other collection of symbols associated with predetermined ordering.

In some embodiments, each writing thread can use a different set of symbols having a predetermined order, such that the analyzing thread will compare the order within each memory location in accordance with the symbol set associated with the particular writing thread that wrote to that location.

Each thread successively stores the symbols according to the predetermined order, and each symbol is stored by a transaction. For example, the transaction may include determining the previously stored symbol (e.g., using a non-shared memory space utilized by the thread), determining the following symbol in accordance with the predetermined order, and storing the following symbol back to the location.

One or more of the threads may be designated as reading threads, which sample the contents of the private memory locations to which the writing threads stored symbols. Optionally, loading the contents of the private memory locations is also done using transactions, such that a snapshot of all memory locations is obtained without intermediate accesses to memory locations by writing threads. On each reading, the reading thread loads the contents of all private memory locations in which the writing threads stored the symbols, i.e., the reading thread reads a number of private memory locations, such as all private memory locations which are written to by the writing threads. In some exemplary embodiments, the number of private memory locations read by the reading thread is at least equal to the number of writing threads.

One or more of the threads may be designated as merger threads that analyze the collection of symbols obtained by the reading threads for inconsistencies with respect to the predetermined order of the symbols. In some embodiments one or more of the reading threads can also operate as merger threads.

Some order inconsistencies relate to the values loaded by a single reading thread. For example, if two readings made by the same reading thread are such that for a particular memory location the earlier reading obtains a symbol that follows (immediately or non-immediately) in the predetermined order the symbol obtained at the later reading, then serialization has been violated.

Other order inconsistencies may relate to the symbols loaded by two or more reading threads. For example, consider a scenario of a first reading thread making at least one reading, and a second reading thread making least one reading. If the two readings cannot be ordered such that within each memory location the symbols are in accordance with the predetermined order, then the storing operations cannot be serialized in a consistent manner, thus resulting in order inconsistency.

The disclosed solution can be extended, by utilizing also shared counters, i.e., memory locations accessible for writing by multiple threads (also referred to as non-private memory locations).

Thus, in some exemplary embodiments, the solution may comprise private counters accessible for writing only for the owning thread, and accessible for reading to all threads, and shared counters which are memory locations accessible for writing to a group of threads and accessible for reading to all threads.

In some embodiments, there may be a single private counter associated with each thread, and any number of shared counters accessible for writing by groups of threads, including a multiplicity of shared counters which may be associated with the same group of threads. It will be noted that a single thread may be associated with any number of shared counters.

Each thread may perform an update operation, or a check operation. In some exemplary embodiments, an update operation, such as incrementing, takes effect over all its associated counters, private and shared. Thus when a thread is updating it increments the values of its private counter, if such exists, and of all shared counters with which it is associated, if any exist.

In a check operation, a thread chooses a set of all the threads in the system, which may or may not be a subset of all threads, and checks that one or more invariants hold with respect to all counters associated with the subset, including private counters for all threads in the subset and shared counters owned by threads from the subset.

The invariants may include but are not limited to any one or more of the following:

1. The value of each counter has not decreased since the last check, for this purpose the thread may keep a shadow counter for the last observed value for every counter in the subset. In response to reading new value, the shadow counter may be updated with the newly observed value, which may be utilized in next observation.

2. With respect to a group of threads that is associated with a shared counter, the sum of all private counters of the threads of the groups is equal to the value of the shared counter. It will be appreciated that this check requires that the symbols stored in different memory locations are of compatible types so they can be summed. As one example, the symbols may all be integers. As another example, some of the symbols may be integers having a first increment (e.g., by one) and others may be integers having a second increment (e.g., by two). Additionally or alternatively, the symbols may be generated using a different operator than incrementing, such as decrementing.

3. All shared counters associated with the same group of threads hold the same value.

4. A thread's private counter holds the last value with which the thread updated it.

In some embodiments, each thread may choose which action to perform, and may choose to update or to check at different times and situations. It will be appreciated that in some embodiments, a thread may perform both an update and a check on the same transaction, which may provide different results than performing two separate actions.

The disclosed scenario may test serializability in hardware or software devices, but may be more useful for hardware devices, since for software devices the serializability is naturally maintained in many cases. The disclosed scenario may also test atomicity in hardware or software devices.

In some embodiments, the symbols may be stored into and read from remote or non-continuous memory areas, thus further testing the transaction atomicity. As an example, storing may be performed using two or more store operations, each associated with a different portion of the target memory location. Thus, a storing operation may be a non-atomic operation. For example, in case the target memory location is a 32 bit, a first operation may store the 16 Most Significant Bits (MSBs) and a second operation may store the 16 Least Significant Bits (LSBs). In some exemplary embodiments, one or more of the target memory locations may be fragmented into non-continuous locations.

It will also be appreciated that the disclosed inconsistencies and analysis are exemplary only and other order inconsistencies can be detected in similar manner.

The disclosed method and apparatus can be executed by a pre-silicon test generator for simulation before the tested hardware is available, but also by a post-silicon exerciser on actual tested hardware, for example by a template based exerciser, such as Threadmill™ which is disclosed in A. Adir et al, "Threadmill: A Post-Silicon Exerciser for Multi-Threaded Processors", Proceedings of the 48th Design Automation Conference (DAC), 2011: 860-865, and in A. Adir et al, "A unified methodology for pre-silicon verification and post-silicon validation", Proceedings of the 2011 Design, Automation and Test in Europe Conference, 2011, both documents hereby incorporated by reference in their entirety. Additionally, the disclosed method and apparatus can be used for testing software products that should comply with a specification that includes transactions, such as JVM or database management systems, by executing several concurrent clients of these applications, which implement the above roles.

Testing in accordance with the disclosed subject matter can be executed for long periods of time. In some exemplary embodiments, read values are verified in a substantially same rate as being read. Testing may thus be efficient and scalable, and may not need to keep track of all the operations. Also, each test specifically includes transactional operations that depend on correct implementation of the transactional specification, thus increasing the chances of triggering and detecting a related bug.

One technical effect of the disclosed subject matter is the testing of devices that support transactions for atomicity and serialization. Regarding atomicity, the disclosed subject matter detects situations in which a transaction is not atomic, i.e., an instruction by another thread was performed in between instructions of the transaction, which may result in data inconsistencies. For example, this may cause situations in which when transferring money between two accounts one account is being debited without the other one being credited, booking a ticket while leaving it available, or similar Inter-Process Communication (IPC) problems.

Regarding serializability, the disclosed subject matter detects situations in which two transactions try to access a shared resource, wherein the order at which the transactions accessed the resource cannot be determined unequivocally. This may result in situations in which, for example, two bookings are made for the same ticket wherein a first thread observes a first order of bookings and a second thread observes a different order of booking, thus it may be impossible to decide which one was earlier.

Another technical effect of the disclosed subject matter relates to testing the transaction platform directly, and not using a specific application. The disclosed subject matter provides a general scenario which may be aimed at testing the platform providing the transactions interface. This may be advantageous in that the implementation of any specific application may be erroneous and introduce bugs, and that any application tests only specific situations and not the functionality of the platform itself.

Yet another technical effect of the disclosed subject matter relates to the testing efficiency, and using substantially less resources, such as memory and time. This is of particular importance when testing hardware devices, for which the timetable for testing is usually limited and it is required to keep the device active as much of the time as possible.

Referring now to FIG. 1A, showing a schematic illustration of order inconsistencies that can be checked, in accordance with some embodiments of the disclosed subject matter.

In the scenario of FIG. 1A, four writing threads are generated, each storing incrementing integers into memory locations, such that writing thread 1 (100) stores integers in memory location 1 (120), writing thread 2 (104) stores integers in memory location 2 (124), writing thread 3 (108) stores integers in memory location 3 (128), and writing thread 4 (112) stores integers in memory location 4 (132).

It will be appreciated that the number of threads being used may be fewer or greater than four. It will also be appreciated that a thread may store any other symbols, such as characters, integers in any other predetermined order, or the like. In some embodiments, each writing thread can use a different collection of symbols, for example thread 1 (100) can use decrementing integers, thread 2 (104) can use alphabet characters, thread 3 (108) can use incrementing integers, or the like. Each writing thread may be operative to concurrently operate to store the symbols in its respective memory location at its own pace.

In some exemplary embodiments, the symbols are ordered such that portions of the memory locations which are normally accessed in a non-atomic manner (e.g., locations on different coherency granule, such as a cache line, or locations stored using different store instructions) are modified when changing from a first symbol to the next symbol. For example, assuming two portions of 16 bit each, the value of a symbol may be incremented by 65,535 (2^16-1) to determine the next symbol, and thus both the MSB and LSB bits may be modified.

The symbols stored at memory location 1 (120), memory location 2 (124), memory location 3 (128) and memory location 4 (132) are repeatedly read by reading thread 1 (136) and reading thread 2 (140). Each of reading thread 1 (136) and reading thread 2 (140) may read all four memory locations, such as during a single transaction. Reading thread 1 (136) first obtains reading 11 (144) and then reading 12 (148), while reading thread 2 (140) first obtains reading 21 (152) and then reading 22 (156). The readings are analyzed by one or more analyzing threads. In some exemplary embodiments, some or all of the reading threads also act as analyzing threads.

For example, as indicated by line 160, in reading 11 (144) and reading 12 (148) wherein reading 11 (144) occurs before reading 12 (148), an order inconsistency is detected, as the contents of memory location 3 (128) decreased between an earlier reading and a later reading, while writing thread 3 is configured to store incrementing integers.

In another example, as indicated by lines 164 and 168, reading 11 (144) and reading 22 (156) cannot be serialized in a consistent manner Memory thread 2 having a value of "4" in reading 11 (144) and a value of "5" in reading 22 (152) suggests that reading 11 (144) preceded reading 22 (152). However, memory location 4 having a value of "4" in reading 11 (144) and a value of "3" in reading 22 (152) suggests that reading 22 (152) preceded reading 11 (144). Thus these two optionally transactional readings or observations cannot be serialized in a consistent manner with the write transactions. In some exemplary embodiments it may be said that reading thread 1 (136) and reading thread 2 (140) observed different ordering of operations of writing thread 2 (104) and writing thread 4 (112)

It will be appreciated that threads can be assigned multiple roles concurrently with respect to different scenarios and counters. For example a thread could be a writer for one counter and a reader or analyzer for another counter at the same time.

Figure 1B:
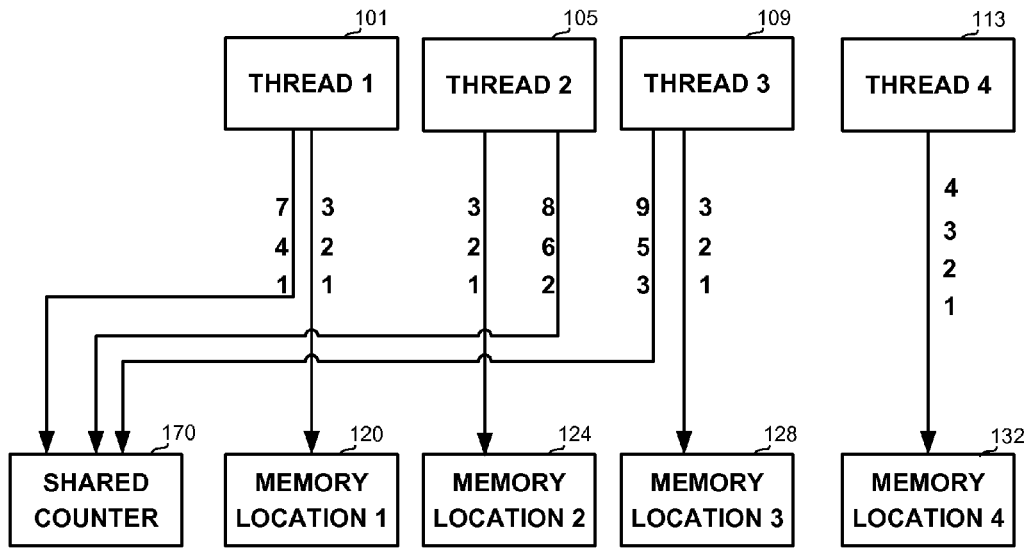
Figure 1B:
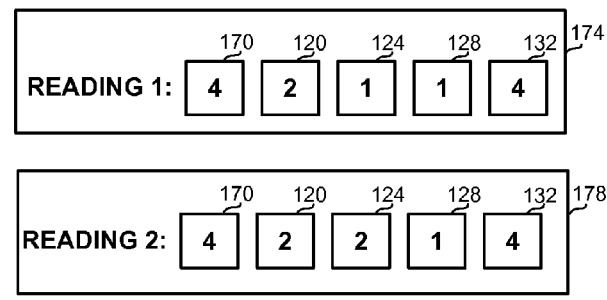

Referring now to FIG. 1B, showing a schematic illustration of order inconsistencies that can be checked, in accordance with other embodiments of the disclosed subject matter.

FIG. 1B shows four threads, thread 1 (101), thread 2 (105), thread 3 (109) and thread 4 (113). As in FIG. 1A, each of the four threads is associated with a private memory location: memory location 1 (120) associated with thread 1 (101), memory location 2 (124) associated with thread 2 (105), memory location 3 (128) associated with thread 3 (109), and memory location 4 (132) and associated with thread 4 (113).

Also shown is shared memory location 170, accessible for writing by thread 1 (101), thread 2 (105), and thread 3 (109).

Thread 1 (101), thread 2 (105), and thread 3 (109) perform update operations in the order indicated by the numbers 1-9, i.e., thread 1 (101) performs an update operation and updates its private counter in memory location 1 (120) and shared counter 170 (setting to 1,1 respectfully), then thread 2 (105) performs an update operation and updates its private counter in memory location 2 (124) and shared counter 170 (setting to 1,2 respectfully), and so on. It will be noted that the order of operations may be any order, and may be dynamically determined (e.g., by a thread scheduler). The described order is a non-limiting example. Thread 4 may also perform update operations, at times independent of the update times of thread 1, thread 2 and thread 3.

After at least one update operation, any of the threads may perform a check operation, relating to threads in the system.

As an example two readings are described: reading 1 and reading 2.

Reading 1 (174) obtains a value of 4 in shared counter 170, a value of 2 in memory location 1 (120), a value of 1 in memory location 2 (124), a value of 1 in memory location 3 (128), and a value of 4 in memory location 4 (132).

Reading 2 (178) obtains a value of 4 in shared counter 170, a value of 2 in memory location 1 (120), a value of 2 in memory location 2 (124), a value of 1 in memory location 3 (128), and a value of 4 in memory location 4 (132).

The readings are checked for compliance with a number of validity checks, for example the four checks detailed above:

Check 1 is irrelevant for reading 1 (174), but becomes relevant on reading 2 (178), and passes since the observed values of all counters have not decreased.

As for check 2, in reading 1 (174), when considering thread 1 (101), thread 2 (105) and thread 3 (109), the sum of their private counters 120, 124 and 128 is 2+1+1=4, which is equal to the value of their shared counter (170).

However, for reading 2 (178), this check does not hold: the sum of private counters 120, 124 and 128 is 2+2+1=5, which is unequal to the value of shared counter (170), being 4.

Check 3 is irrelevant in this example since there is just one shared counter.

Check 4 holds for reading 1 (174): each thread's private counter holds the last value with which the thread updated it, but does not hold for reading 4 (178), which is inconsistent update 5 being performed by thread 3 (109) and update 6 being performed by thread 2 (105).

Figure 2:
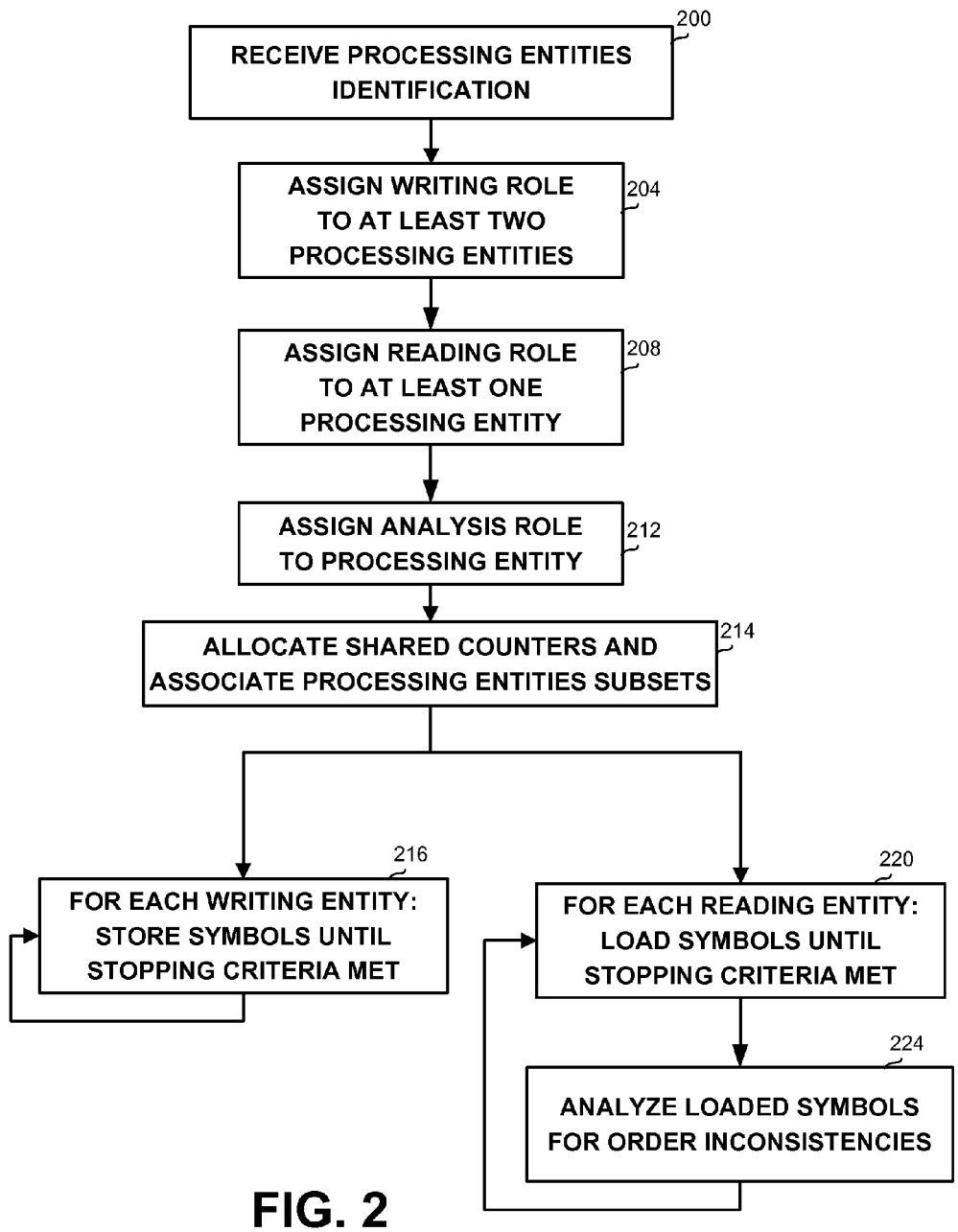
FIG. 2 shows a flowchart of steps in a method for testing concurrent executing entities, in accordance with some exemplary embodiments of the disclosed subject matter.

Referring now to FIG. 2, showing a flowchart of steps in a method for testing concurrent executing entities such as threads for atomicity and serializability.

On step 200 identification of processing entities may be received. The processing entities can be created exclusively for testing, or the testing instructions can be combined with additional instructions. In yet another alternative, unique entity identifiers can be received for already existing entities. In some embodiments, the entities are spawned threads. For simplicity, the steps below relate to threads, however, it will be understood that they may be implemented for any other processing entities.

Optional steps 204, 208 and 212 detailed below relate to assigning roles to each of the threads. Steps 204, 208 and 212 may be required in some embodiments, such as described in association with FIG. 1A above, in which each thread is associated with a specific role. It will be appreciated that steps 204, 208 and 212 can be combined with creating or receiving the threads and are not necessarily executed separately or in any binding order. Additionally or alternatively, a predetermined initial writer thread may be spawned into writing threads, thereby combining steps 200 and 204. In a similar manner, step 200 may be combined with any of steps 204, 208, 212.

On step 204 a writing role may be assigned to at least two of the threads, such that each of the writing threads writes symbols in a predetermined order into a dedicated memory location. In some exemplary embodiment, assigning the writing role comprises providing a dedicated memory location, a set of symbols, and/or predetermined order of the symbols.

On step 208 a reading or loading role may be assigned to at least one of the threads, such that each of the reading threads samples symbols from all memory locations into which the writing threads stored the symbols. In some exemplary embodiment, assigning the reading role comprises providing the dedicated memory locations into which the writer threads are operative to write, so that the reading thread would be able to read therefrom.

On step 212 an analysis role may be assigned to at least one of the threads, for analyzing the values obtained by the reading threads for order inconsistencies. In some exemplary embodiment, assigning the analysis role comprises providing the predetermined order of symbols associated with each dedicated memory location, so that the analyzing thread would be able to check correctness of the values read.

In some embodiments, one or more of the analysis threads can be one or more of the reading threads assigned on step 208. However, in some exemplary embodiments, for those analysis types that refer to values obtained from two reading threads, a separate or additional analysis thread may still be utilized, so as to improve efficiency of analysis operation.

On optional step 214, shared counters are allocated, and processing entities subsets owning each shared counter are determined. Step 214 may be useful in some embodiments, such as described in association with FIG. 1B above, which utilize shared counters.

It will be appreciated that steps 204, 208 and 212 can be performed for some threads, while step 214 can be performed for other threads.

On step 216, each of the writing threads may store symbols in a predetermined order into a dedicated memory location. It will be appreciated that a writing thread may relate to a thread indicated as a writing thread on step 204, or to any of the threads which may be associated with a shared counter. The thread updates its one or more private counters, and if the thread is associated with a shared counter, then it updates the shared counter as well. Any update order of the counters may be utilized. In some exemplary embodiments, all updates are performed in a single transaction. Storing continues until a stopping criteria is met, such as the numbers of stored symbols reached a predetermined limit for example the maximal number representable in the memory location, or the thread chooses to perform a check operation. It will be appreciated that the writing threads may operate concurrently and each may store the symbols in its memory location at a different rate, which may vary over time.

On step 220, which optionally occurs concurrently with the writings of step 216, each reading thread may sample the memory locations into which the writing threads store the symbols. It will be appreciated that a reading thread may relate to a thread indicated as a reading thread on step 208, or to any one of the threads. In the latter case, the thread determines the subset of all threads it is going to check, for example all threads. The thread then reads the values of all private and shared threads associated with the subset. In some exemplary embodiments, the reading threads log the read values. The values may be logged in a file, in a queue, or in any other logging technique. Optionally, each reading thread may log the values in a different log.

On step 224 the symbols as loaded by the reading threads on step 220 may be analyzed for order inconsistencies. Analysis may relate to two or more consecutive readings of a single reading thread, or to readings of different reading threads, as detailed in association with FIG. 1A above.

On step 224, in case an analysis may determine that a transaction property was violated, such as that the values as read indicate lack of seriliazability and/or atomicity, an indication of a bug may be provided.

In some exemplary embodiments, an analyzing thread may be operative to repeatedly review values read by the reading threads, such as by reading the log files. In some exemplary embodiments, as the analysis thread is separate than the reading threads, analysis of the read values does not interfere with continued readings of values by the reading threads. Additionally or alternatively, one or more reading threads may be implemented to act also as analyzing threads.

Steps 220 and 224 may be repeated, optionally until a stopping criteria has been met, such as not observing any change in the loaded symbols for at least a predetermined period of time, or any other stopping criteria.

It will be appreciated that in embodiments in which the threads are not assigned roles but may rather perform update and check operations, a particular thread may choose anytime to perform step 216, or steps 220 and 224.

In some embodiments, after the test is done, the storing, loading and analyzing can then be repeated wherein the storing threads may store the symbols into different cache lines, from which the reading threads may load them.

It will be appreciated that in order to test one or more transactions for atomicity, the storing and loading of symbols can be made naturally non-atomic, e.g., by splitting any one or more symbol between two memory regions or by using unaligned accesses. Additionally or alternatively, in case the memory location comprises memory regions from different cache granulites, the storing operation may be non-atomic. Other manners to ensure non-atomicity may exist. For example, non-atomicity of store/load operation may be ensured by the architecture of the tested device. With this arrangement, atomicity may need to be handled by the transaction implementation which may thus be tested.

In some embodiments, the scenario can include "fillers", e.g., predetermined or random operations that do not share the same resources used in the scenario and therefore are not expected to affect its operation. However these operations can potentially interfere with the participating threads by accessing close resources such as locations in the same cache lines as the memory locations to which the symbols are stored, or compete over other resources such as computation resources including for example execution units, shared registers, or queues. Such interferences can create new and unexpected situations and may help detecting bugs in the scenarios described above. Such filler operations can comprise transactional or non-transactional accesses to other memory locations, or transactional or non-transactional loading accesses from the memory locations, or transactional or non-transactional store accesses to different memory locations either in the same or in a different coherency granule, or any combination thereof. It will be appreciated that in some cases, filler may be directed at causing "false sharing" scenarios, such as by performing a store access in a memory location adjacent one of the memory locations, which is located on the same cache granule.

Figure 3:
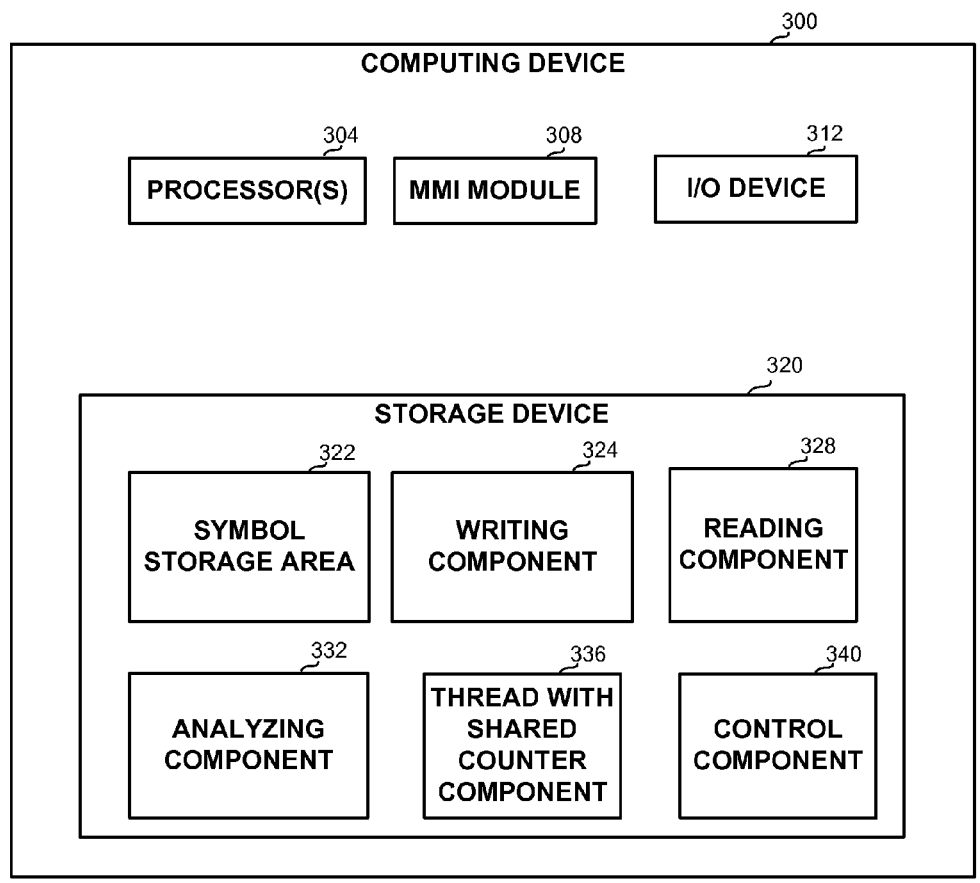
FIG. 3 shows a block diagram of components of an apparatus for testing transactions, in accordance with some exemplary embodiments of the disclosed subject matter.

Referring now to FIG. 3, showing a block diagram of components of an apparatus for testing transactions.

The environment comprises a computing device 300, which may comprise one or more processors 304. Any of processors 304 may be a Central Processing Unit (CPU), a microprocessor, an electronic circuit, an Integrated Circuit (IC) or the like. Alternatively, computing device 300 can be implemented as firmware writers for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by computing device 300 or any of it subcomponents.

In some exemplary embodiments of the disclosed subject matter, computing device 300 may comprise a man machine interface (MMI) module 308. MMI module 308 may be utilized to receive input or provide output to and from the apparatus, for example receiving specific user commands or parameters related to the apparatus, storing and retrieving information to and from a database, providing output, or the like.

In some embodiments, computing device 300 may comprise an input-output (I/O) device 312 such as a terminal, a display, a keyboard, an input device or the like to interact with the system, to invoke the system and to receive results. It will however be appreciated that the system can operate without human operation and without I/O device 312.

In some embodiments, computing device 300 may provide an interface for performing transactions. The interface may be implemented as part of MMI module 308 or separately. The transactions may be implemented using software components, hardware components, combination thereof, or the like.

Computing device 300 may comprise one or more storage devices 320 for storing executable components, and which may also contain data during execution of one or more components. Storage device 320 may be persistent or volatile. For example, storage device 320 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 320 may retain program code operative to cause any of processors 304 to perform acts associated with any of the steps shown in FIG. 2 above, for example storing symbols, loading symbols or analyzing the loaded symbols.

Storage device 320 may comprise one or more symbol storage areas 322 for storing symbols by the writing threads, and from which the symbols are loaded by the reading threads. Optionally, symbol storage area 322 may be associated with two or more cache granulites, so that storing a symbol to symbol storage area 322 may be a non-atomic operation.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

In some embodiments the loaded components include an executable component for implementing a writing component 324, such as a writing thread which stores symbols into symbol storage area 322 as described in association with 216 step of FIG. 2 above, an executable component for implementing a reading component 328, such as a reading thread which loads symbols as described in association with step 220 of FIG. 2 above, and an analysis component for implementing an analyzing component 332 as described in association with step 224 of FIG. 2 above.

Storage device 320 may also comprise thread with shared counter component 336 for implementing updating and checking threads as described in association with FIG. 1B above.

Storage device 320 may also comprise control component 340 for spawning the threads, or assigning roles or operation to threads, or otherwise controlling the data and operations flow within the system.

The disclosed methods and apparatus enable the testing of devices for testing transactions in a multithread or multi-processor environment for atomicity and serialization.

The tests may be self-checking so no comparison to pre-determined results is required, thus saving on execution time and better utilizing the tested devices.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:

having a plurality of processing entities operating substantially concurrently in a computerized platform enabling transaction operations, wherein the plurality of processing entities comprise at least two entities adapted to store values, and at least one entity adapted to load values, wherein each writing entity is associated with a private memory location within a memory unit;

storing symbols into an associated target memory location by each of the at least two entities adapted to store values, wherein for each of the at least two entities symbols are stored according to a predetermined order, wherein a symbol is stored using a transaction;

at least one entity adapted to load values repeatedly loading values, wherein in each loading the at least one entity adapted to load values loading values from a multiplicity of private memory locations, to obtain a reading comprising loaded values; and analyzing the loaded values for at least one invariant, wherein the at least one invariant being held is indicative that the transaction operations of the computerized platform adheres to a property, whereby testing operation of the computerized platform.

2. The computer-implemented method of claim 1, wherein the at least one invariant comprises a situation in which the at least one entity adapted to load values loaded an earlier series of values and a later series of values, and wherein a value of a first memory location in the later series is earlier in accordance with the predetermined order than a value of the first memory location in the later series.

3. The computer-implemented method of claim 1, wherein the at least one entity adapted to load values comprises at least a first reading entity and a second reading entity, wherein the invariants comprise a situation in which the first reading entity loaded a first series of values, and the second reading entity loaded a second series of values, and wherein a value of a first memory location in the first series is preceding a corresponding value in the second series in accordance with the predetermined order, and a value of a second memory location in the first series is following a corresponding value in the second series in accordance with the predetermined order.

4. The computer-implemented method of claim 1, wherein analyzing the loaded values is done by a processing entity separate from the at least two writing entities and the at least one reading entity.

5. The computer-implemented method of claim 1, wherein any of the multiplicity of memory locations is split between two memory regions of the memory unit, wherein the two memory regions are located on different coherency granules.

6. The computer-implemented method of claim 1, wherein two or more of the multiplicity of private memory locations are comprised in different coherency granules of the memory unit.

7. The computer-implemented method of claim 1, wherein said storing, loading and analyzing are repeated until each of the writing entities stored at least a predetermined number of symbols.

8. The computer-implemented method of claim 7, wherein said storing comprises storing symbols in one cache line, and further comprising said storing, loading and analyzing for a second cache line of the memory unit.

9. The computer-implemented method of claim 1, wherein any of the entities adapted to store values or entities adapted to load values performs additional operations inbetween the storing or the loading, respectively.

10. The computer-implemented method of claim 1, wherein the at least two entities adapted to store values comprises a first and a second writing entities, wherein the first writing entity stores symbols in accordance with a first set of symbols and wherein the second writing entity stores symbols in accordance with a second set of symbols, wherein the first and second sets of symbols are independent of each other.

11. The computer-implemented method of claim 1, wherein the method is implemented for testing a hardware product.

12. The computer-implemented method of claim 1, wherein the method is implemented for testing software products for compliance with specification that includes transactions.

13. The computer implemented method of claim 1, wherein each entity adapted to store values is associated with a different ordering of the symbols.

14. The computer implemented method of claim 1, wherein the loading is performed using a transaction.

15. The computer implemented method of claim 1, wherein at least one of the processing entities is a thread.

16. The computer-implemented method of claim 1, wherein at least two entities adapted to store values store values into a shared memory location and into a private memory location, and at least one entity adapted to load values loads values from private memory locations and from shared memory locations associated with a subset of the processing entities.

17. The computer-implemented method of claim 16, wherein the at least one invariant is selected from the group consisting of: a value of each private memory location or shared memory location has not decreased since a previous check; a sum of all symbols stored in private memory location of a group of threads having a shared counter is equal to the value of the shared counter; all shared counters associated with a subset of processing entities hold the same value;

and a private memory location stores a value with which the associated processing entity updated to store values last updated it.

18. An apparatus having a processing unit and a storage device, the apparatus comprising:

at least two components adapted to store values, each component storing symbols having a partial order into one a private memory locations within a memory unit, wherein for each of the at least two components symbols are stored according to a predetermined order such that each symbol is stored once, and wherein each symbol is stored using a transaction;

a component adapted to repeatedly obtaining a reading, each reading comprises a plurality of load values stored within the private memory locations; and an analysis component for analyzing the values loaded by the component adapted to load values for invariants, wherein the at least one invariant being held is indicative that the transaction operations of the computerized platform adheres to a property, whereby testing operation of the computerized platform, wherein the at least two components adapted to store values, the component adapted to load values and the analysis component are configured to operate substantially concurrently.

19. The apparatus of claim 18, further comprising a control component configured to create the at least two writing components, the component adapted to load values and the analysis component.

20. The apparatus of claim 18, wherein the analysis component is adapted to test an invariant in which an instance of the component adapted to load values loaded an earlier series of values and a later series of values, and wherein a value of a first private memory location in the later series is earlier in accordance with the partial order than the value of the first private memory location in the later series.

21. The apparatus of claim 18, wherein the analysis component is adapted to test an invariant in which a first instance of the component adapted to load values loaded a first series of values, and a second instance of the component adapted to load values loaded a second series of values, and wherein a value of a first private memory location in the first series is preceding a corresponding value in the second series in accordance with the partial order, and a value of a second private memory location in the first series is following a corresponding value in the second series.

22. The apparatus of claim 18, wherein any of the private memory locations is split between two memory regions of the memory unit.

23. A computer program product comprising:
a non-transitory computer readable medium;
a first program instruction for having a plurality of processing entities operating substantially concurrently in a computerized platform enabling transaction operations, wherein the plurality of processing entities comprise at least two entities adapted to store values, and at least one entity adapted to load values, wherein each writing entity is associated with a private memory location within a memory unit;
a second program instruction for storing symbols into an associated target memory location by each of the at least two entities adapted to store values, wherein for each of the at least two entities symbols are stored according to a predetermined order, wherein a symbol is stored using a transaction;
a third program instruction for repeatedly loading values by the at least one entity adapted to load values, wherein in each loading obtaining values from a multiplicity of private memory locations to obtain a reading comprising loaded values;
a fourth program instruction for analyzing the loaded values for at least one invariant, wherein the at least one invariant being held is indicative that the transaction operations of the computerized platform adheres to a property, whereby testing operation of the computerized platform; and
wherein said first, second, third and fourth program instructions are stored on said non-transitory computer readable medium.

\* \* \* \* \*